(12) United States Patent
Suhmoon

(10) Patent No.: US 7,328,187 B2
(45) Date of Patent: Feb. 5, 2008

(54) SYSTEM AND METHOD FOR ISSUING CYBER PAYMENT MEANS MARKED WITH BUSINESS IDENTIFICATION INFORMATION AND PROCESSING TRANSACTIONS WITH THE CYBER PAYMENT MEANS ON COMPUTER NETWORK

(75) Inventor: Hoon Suhmoon, Koyang (KR)

(73) Assignee: Star Bank Co., Ltd., Seoul (KR)

( * ) Notice: Subject to any disclaimer, the term of this patent is extended or adjusted under 35 U.S.C. 154(b) by 1267 days.

(21) Appl. No.: 09/783,961

(22) Filed: Feb. 16, 2001

(65) Prior Publication Data

US 2001/0014879 A1 Aug. 16, 2001

(30) Foreign Application Priority Data

Feb. 16, 2000 (KR) ................................. 2000-7300

(51) Int. Cl.
*G06Q 99/00* (2006.01)
(52) U.S. Cl. .............................. 705/39; 705/1; 705/50; 705/64; 705/65; 713/159
(58) Field of Classification Search .................. 705/50, 705/33, 35–39, 64–70; 713/159
See application file for complete search history.

(56) References Cited

U.S. PATENT DOCUMENTS 5,119,293 A * 6/1992 Hammond .................... 705/24
5,897,625 A * 4/1999 Gustin et al. .................. 705/43

(Continued)

OTHER PUBLICATIONS

Donald O'Mahony, Michael Peirce, and Hitesh Tewari, "Electronic Payment Systems", 1997, Artech House, p. 7-11.*

(Continued)

*Primary Examiner*—Kambiz Abdi
(74) *Attorney, Agent, or Firm*—Lee & Morse, P.C.

(57) ABSTRACT

A system for issuing cyber payment means (cyber notes, cyber checks, cyber payment certificates, etc.) marked with business identification information, on a computer network, and a method thereof are provided. The method has the steps of (a) a server computer on the computer network, receiving information including business identification information and the number of a current account from a user and storing the information by user in a database managed by the server computer; (b) at the request of a user accessing the server computer, issuing a cyber payment means marked with at least a unique number of the payment means, a business identifier of the corresponding user, and the amount of money, and storing the issued cyber payment means by user in the database; and (c) if a first user, who has the issued cyber payment means, performs payment for a second user, using the cyber payment means when the first user is connected to the server, the cyber payment means being moved from the first user to the second user inside of the database. According to the method and system, since transaction processing by the cyber payment means can be performed only when the server computer is connected, the security problem of existing network-type electronic money can be solved. Business identification information marked on the cyber payment means enables to obtain transparency of transactions. Also, since a cyber promissory note or a cyber check denoting a large amount of money can be divided and transferred, payment means denoting large amounts of money can be utilized as payment means for small amounts of money.

5 Claims, 15 Drawing Sheets

U.S. PATENT DOCUMENTS

| | | | |
|---|---|---|---|
| 5,966,698 A * | 10/1999 | Pollin | 705/34 |
| 6,223,169 B1 * | 4/2001 | Mori et al. | 705/41 |
| 6,321,213 B1 * | 11/2001 | Ito et al. | 705/39 |
| 6,615,193 B1 * | 9/2003 | Kingdon et al. | 705/65 |
| 6,625,733 B1 * | 9/2003 | Yasukura | 726/28 |
| 6,904,418 B2 * | 6/2005 | Walker et al. | 705/76 |
| 6,963,843 B1 * | 11/2005 | Takatsu et al. | 705/1 |
| 2002/0082985 A1 * | 6/2002 | MacKay | 705/39 |
| 2004/0199466 A1 * | 10/2004 | Chi | 705/42 |
| 2005/0097060 A1 * | 5/2005 | Lee et al. | 705/65 |

OTHER PUBLICATIONS

David Kosiur, "Elelctronic Commerce", 1997, Microsoft Press, p. 49-51.*

* cited by examiner

FIG. 2A

| ITEMS TO BE WRITTEN ON THE FRONT SURFACE OF PROMISSORY NOTE(EXAMPLE) |
|---|
| * CHARACTERS INDICATING PROMISSORY NOTE(PRINTED FORM) |
| * UNCONDITIONAL PROMISE OF INTENTION THAT PREDETERMINED AMOUNT OF MONEY SHALL BE PAID(PRINTED FORM) |
| * DUE DATE |
| * PLACE TO PAY |
| * RECEIVER |
| * ISSUE DATE |
| * SIGNATURE OR SEAL OF ISSUER |

FIG. 2B

| ITEMS TO BE WRITTEN ON THE BACK SURFACE OF PROMISSORY NOTE(EXAMPLE) |
|---|
| * DECLARATION OF INTENTION OF ENDORSEMENT(PRINTED FORM) |
| * ENDORSER'S ADDRESS |
| * NAME AND SEAL OF ENDORSER |

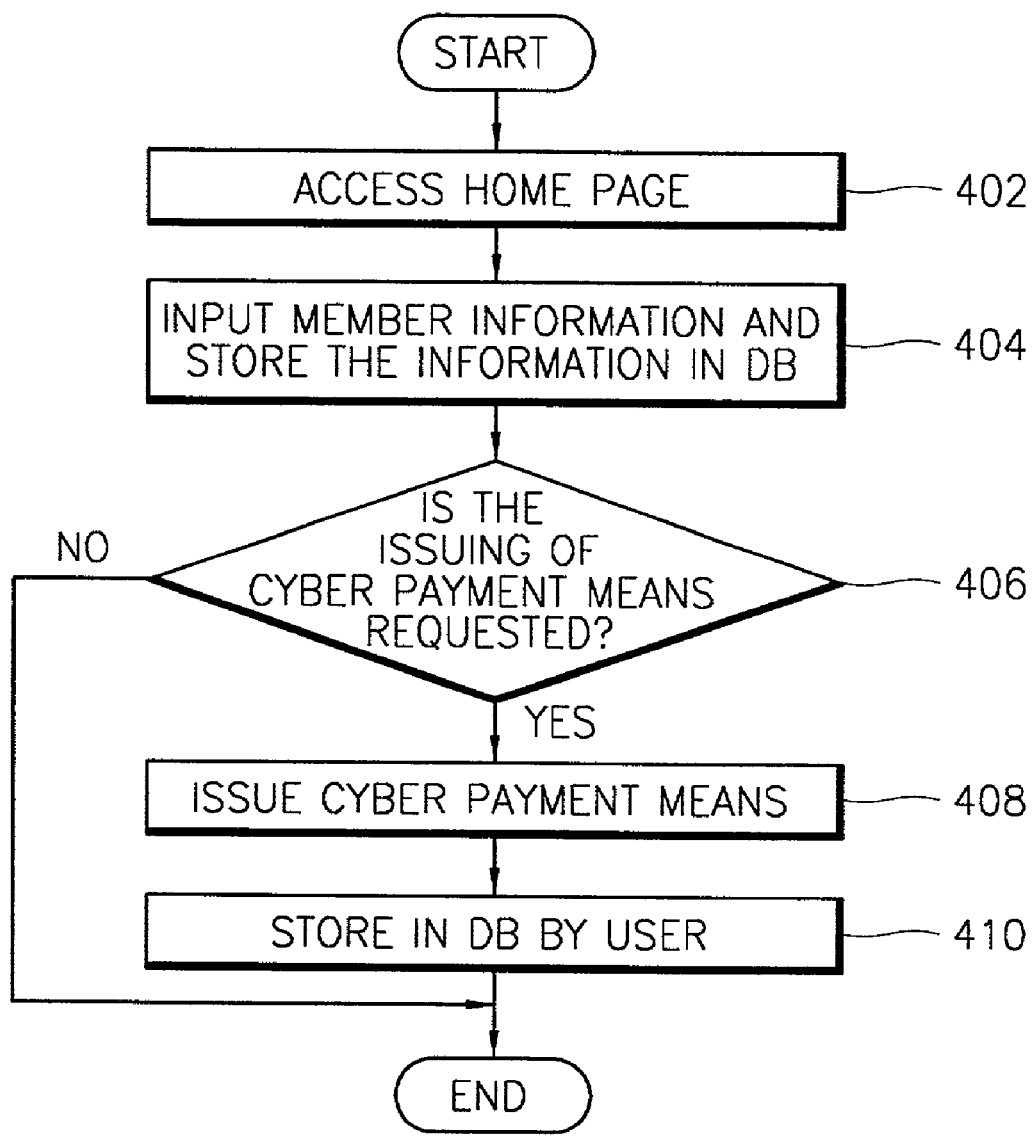

FIG. 5A

| INPUT ITEMS FOR CYBER NOTE(EXAMPLE) |
|---|
| * DUE DATE<br>* AMOUNT OF MONEY<br>* RECEIVER'S BUSINESS REGISTRATION NUMBER<br>* ISSUE DATE<br>* ISSUER'S BUSINESS REGISTRATION NUMBER |

FIG. 5B

| INPUT ITEMS FOR CYBER NOTE ENDORSEMENT(EXAMPLE) |
|---|
| * ENDORSEMENT DATE<br>* RECEIVER'S BUSINESS REGISTRATION NUMBER<br>* ENDORSER'S BUSINESS REGISTRATION NUMBER |

FIG. 6B

```
┌─────────────────────────────────────────────┐
│         ┌─────────────────────────┐         │
│         │   CYBER PAYMENT SYSTEM  │         │
│         └─────────────────────────┘         │
│                                             │
│   ┌──────────────┬──────────────────────┐   │
│   │ COMPANY NAME │                      │   │
│   ├──────────────┼──────────────────────┤   │
│   │   BUSINESS   │                      │   │
│   │ REGISTRATION │                      │   │
│   │    NUMBER    │                      │   │
│   └──────────────┴──────────────────────┘   │
│                                             │
│ * PLEASE SELECT CYBER NOTE TRANSACTION OR   │
│   CYBER CHECK TRANSACTION                   │
│                                             │
│      ┌──────────────┐   ┌──────────────┐    │
│      │ CYBER CHECK  │   │  CYBER NOTE  │    │
│      └──────────────┘   └──────────────┘    │
└─────────────────────────────────────────────┘
```

FIG. 8A

* YOU HAVE SELECTED CYBER NOTE TRANSACTION

1. PLEASE SELECT SERVICE ITEM

① DATA INQUIRY
② ASK FOR PAYMENT
③ ENDORSEMENT, TRANSFER, BILL DISCOUNT FROM BANK

IN TRANSFER BY ENDORSEMENT OR BILL DISCOUNT FROM BANK, YOU CAN DIVIDE CYBER NOTE.

PLEASE SELECT DIVIDED METHOD OR UNDIVIDED METHOD IN TRANSFER BY ENDORSEMENT OR BILL DISCOUNT FROM BANK.

☑ DIVIDED METHOD    ☐ UNDIVIDED METHOD

FIG. 8B

* YOU HAVE SELECTED DIVIDED METHOD

1. PLEASE INPUT INFORMATION ON PAYMENT BY DIVISION

| BEFORE DIVISION | NUMBER OF NOTE TO BE DIVIDED | | E1234 |
|---|---|---|---|
| | AMOUNT OF NOTE TO BE DIVIDED | | 10,000,000 |
| ENDORSEMENT /TRANSFER DETAIL AFTER DIVISION | NOTE NUMBER | BUSINESS REGISTRATION NUMBER | AMOUNT |
| | E1234-1 | 123-81-00234 | 5,000,000 |
| | E1234-2 | 325-81-12764 | 2,000,000 |
| | E1234-3 | 125-81-52769 | 500,000 |
| | E1234-4 | 325-81-12766 | 120,000 |
| | E1234-5 | 325-81-12767 | 600,000 |
| | E1234-6 | 325-81-12768 | 780,000 |
| | E1234-7 | 325-81-12769 | 1,000,000 |
| | SUM | | 10,000,000 |

CONFIRM    CANCEL

FIG. 8C

* YOU HAVE SELECTED UNDIVIDED METHOD
1. PLEASE SELECT NUMBER OF NOTE TO TRANSFER(DISCOUNT)

|  | NOTE NUMBER | BUSINESS REGISTRATION NUMBER | AMOUNT |
|---|---|---|---|
| NEW ISSUE | E 1234 | 123-81-00234 | 5,000,000 |
|  | E 1235 | 214-81-45454 | 1,000,000 |
|  | E 1236 | 123-81-00234 | 5,000,000 |
|  | SUM | | 11,000,000 |
| NOTE ENDORSED (TRANSFERRED) | A 3546 | 344-81-46464 | 1,500,000 |
|  | N 3848 | 311-81-47869 | 2,900,000 |
|  | D 1289 | 309-81-89364 | 5,000,000 |
|  | SUM | | 9,400,000 |

[ CONFIRM ]  [ CANCEL ]

FIG. 10A

* YOU HAVE SELECTED CYBER CHECK TRANSACTION

1. PLEASE SELECT SERVICE ITEM

① DATA INQUIRY

② ASK FOR PAYMENT

③ TRANSFER

IN TRANSFERRING CYBER CHECK, YOU CAN DIVIDE OR COMBINE CYBER CHECKS RECEIVED

PLEASE SELECT DIVIDED METHOD, UNDIVIDED METHOD, OR COMBINED METHOD FOR TRANSFER

☑ COMBINED TRANFER   ☐ DIVIDED TRANFER   ☐ UNDIVIDED TRANFER

FIG. 10B

| | CHECK NUMBER | BUSINESS REGISTRATION NUMBER | AMOUNT |
|---|---|---|---|
| CHECK BEFORE COMBINATION | E 1234-1 | 123-81-00234 | 5,000,000 |
| | A 8743-2 | 325-81-12764 | 2,000,000 |
| | B 3456 | 125-81-52769 | 500,000 |
| | E 1234-4 | 325-81-12766 | 120,000 |
| | SUM | | 7,620,000 |

* YOU HAVE SELECTED COMBINED TRANSFER
1. PLEASE SELECT CHECK TO BE COMBINED AND TRANSFERRED

| | CHECK NUMBER | BUSINESS REGISTRATION NUMBER | AMOUNT |
|---|---|---|---|
| CHECK AFTER COMBINATION | E 6857 | 338-81-22222 | 7,620,000 |
| | | | |
| | | | |
| | SUM | | 7,620,000 |

[CONFIRM] [CANCEL]

FIG. 10C

| BEFORE DIVISION | NUMBER OF CHECK TO BE DIVIDED | | E1234 |
|---|---|---|---|
| | AMOUNT OF CHECK TO BE DIVIDED | | 10,000,000 |
| TRANSFER DETAIL AFTER DIVISION | CHECK NUMBER | BUSINESS REGISTRATION NUMBER | AMOUNT |
| | E1234-1 | 123-81-00234 | 5,000,000 |
| | E1234-2 | 325-81-12764 | 2,000,000 |
| | E1234-3 | 125-81-52769 | 500,000 |
| | E1234-4 | 325-81-12766 | 120,000 |
| | E1234-5 | 325-81-12767 | 600,000 |
| | E1234-6 | 325-81-12768 | 780,000 |
| | E1234-7 | 325-81-12769 | 1,000,000 |
| | SUM | | 10,000,000 |

\* YOU HAVE SELECTED DIVIDED TRANSFER

1. PLEASE INPUT CHECK TO BE DIVIDED AND TRANSFERRED

[CONFIRM] [CANCEL]

SYSTEM AND METHOD FOR ISSUING CYBER PAYMENT MEANS MARKED WITH BUSINESS IDENTIFICATION INFORMATION AND PROCESSING TRANSACTIONS WITH THE CYBER PAYMENT MEANS ON COMPUTER NETWORK

BACKGROUND OF THE INVENTION

1. Field of the Invention

The present invention relates to a cyber payment means, and more particularly, to a system for issuing a cyber payment means (cyber notes, cyber checks, cyber payment certificates, etc.) marked with business identification information (business registration number, corporation registration number, etc.) and processing transactions with the cyber payment means on the computer network, and a method thereof.

2. Description of the Related Art

In general, a note, particularly a promissory note (hereinafter referred to as a note), is a certificate which shows that a buyer of a product promises the seller to pay money for the product at a predetermined time in the future.

FIG. 1A shows a transaction processing method using a conventional note. If a note issuer 100 asks the bank 102 for delivery of a note, the bank 102 delivers an actual promissory note having the front surface of shown in FIG. 2A and back surface shown in FIG. 2B, considering the issuer's credit rating. Then, the issuer 100 issues and then gives the actual promissory note to the receiver 104, who is the obligee. Later, the receiver 104 can exchange the note for money by submitting the promissory note to the bank on a due date, or discounting the note before the due date. Also, endorsing the note, the receiver 104 can transfer the note to a transferee 106.

FIG. 1B shows a conventional transaction method using cash, checks, or receivables on trade, which can be regarded as payment means.

Here, if A 108 supplies raw materials to B 110, A will have a receivable on trade of B 110. B 110 invalidates the receivable on trade, by paying money (check, cash, etc.). The relation between B 110 and C 112 is similar to that between A 108 and B 110.

The transaction method using the actual note, check, etc., as shown in FIGS. 1A and 1B, has the following problems.

First, the manufacturing cost for the actual note, check, etc., is huge.

Second, since the circulation process of actual notes and checks is complicated, management cost is very high.

Third, since notes and checks are circulated in its printed form, the risk of fake or counterfeit always exists.

Fourth, in the circulation process of an actual note or check, the note or check can be lost.

Fifth, it is difficult and takes a large time to figure out the dishonored amount if an issuer cannot clean the promissory note.

Sixth, since it is impossible to divide and transfer by endorsement a note or a check, the note or check has lower efficiency as a payment means.

Seventh, since a note or a check have no relation with business identification information, it is difficult to use the note or check as data for taxation.

Meanwhile, on computer networks, electronic money such as e-cash exists. However, the use of electronic money causes the inconvenience of having to install separate software in a client system. Also, since conventional electronic money actually circulates through cyber space, the risk of illegal copy always exists. In addition, due to anonymity, conventional electronic money can cause social problems such as bribery or money laundering.

Therefore, to solve the problems of using conventional notes and checks and of using network-type conventional electronic money, the issuance of a cyber payment means with a new concept and a payment method using the cyber payment means are needed.

SUMMARY OF THE INVENTION

To solve the above problems, it is an object of the present invention to provide a system and method for issuing cyber payment means marked with business identification information and processing transactions with the cyber payment means on a computer network, in which cyber payment means (cyber notes, cyber checks, cyber payment certificates) marked with business identification information (business registration number, corporation registration number, etc.) is issued to registered business member and when the registered business member is connected to the server computer, the member performs transaction processing by the cyber payment means on a computer network such as the Internet.

It is another object to provide a system and method for issuing a combined cyber check, which combines a plurality of cyber checks already issued or paid by other users, and processing transactions with the combined cyber check for one user.

It is another object to provide a system and method for issuing cyber checks resulting from the division of a larger cyber check, and processing transactions for a plurality of users by these divided cyber checks.

It is another object to provide a system and method for issuing cyber notes, resulting from the division of a larger cyber check, and processing transactions for a plurality of users by these divided cyber checks.

To accomplish the above object of the present invention, there is provided a method for issuing a cyber payment means marked with business identification information and processing transactions with the cyber payment means on a computer network, the method having the steps of (a) a server computer on the computer network, receiving information including business identification information and the number of a current account from a user and storing the information by user in a database managed by the server computer; (b) at the request of a user accessing the server computer, issuing a cyber payment means marked with at least a unique number of the payment means, a business identifier of the corresponding user, and the amount of money, and storing the issued cyber payment means by user in the database; and (c) if a first user, who has the issued cyber payment means, performs payment for a second user, using the cyber payment means when the first user is connected to the server, the cyber payment means being moved from the first user to the second user inside of the database.

To accomplish another object of the present invention, there is also provided a method for issuing a cyber check marked with business identification information and processing transactions with the cyber check on a computer network, the method having the steps of (a) a server computer on the computer network, receiving information including business identification information and the number of a current account from a user and storing the information by user in a database managed by the server computer; (b) at the request of a user accessing the server computer, issuing a cyber check, marked with at least a unique number of the check, a business identifier of the corresponding user, and the amount of money, within the withdrawal limit of the current account of the corresponding user, and storing the issued cyber check by user in the database; and (c) if a first user, who has the issued cyber check, performs payment to a second user, using the cyber check when the first user is connected to the server, the cyber check being moved from the first user to the second user in the inside of the database.

To accomplish another object of the present invention, there is also provided a method for issuing a cyber note marked with business identification information and processing transactions with the cyber note on the computer network, the method having the steps of (a) a server computer on the computer network, receiving information including business identification information and the number of a current account from a user and storing the information by user in a database managed by the server computer; (b) at the request of a user accessing the server computer, issuing a cyber note, which is related to the current account of the corresponding user and marked with at least a unique note number, a business identifier of the corresponding user, the amount of money, and a due date, and storing the issued cyber note by user in the database; and (c) if a first user, who has the issued cyber note, performs payment to a second user, using the cyber note when the first user is connected to the server, the cyber note being moved from the first user to the second user inside of the database.

To accomplish another object of the present invention, there is also provided a system for issuing a cyber check marked with business identification information and processing transactions with the cyber check on a computer network, the system having a server computer providing services for issuing a cyber check and processing transactions with the cyber check on the computer network; and a database managed by the server computer, in which the server computer receives member information including business identification information and the number of a current account from a user and stores the information by user in a database managed by the server computer; at the request of a user accessing the server computer, issues a cyber check, marked with at least a unique check number, a business identifier of the corresponding user, and the amount of money within the withdrawal limit of the current account of the corresponding user, and stores the issued cyber check by user in the database; and if a first user, who has the issued cyber check, performs payment to a second user, using the cyber check when the first user is connected to the server, the cyber check being moved from the first user to the second user inside of the database.

To accomplish another object of the present invention, there is also provided a system for issuing a cyber note marked with business identification information and processing transactions with the cyber note on a computer network, the system having a server computer providing services for issuing a cyber note and processing transactions with the cyber note on the computer network; and a database managed by the server computer, in which the server computer receives information including business identification information and the number of a current account from a user and stores the information by user in a database managed by the server computer; at the request of a user accessing the server computer, issues a cyber note, which is related to the current account of the corresponding user and marked with at least a unique note number, a business identifier number of the corresponding user, the amount of money, and a due date, and stores the issued cyber note by user in the database; and if a first user, who has the issued cyber note, performs payment to a second user, using the cyber note when the first user is connected to the server, the cyber note being moved from the first user to the second user inside of the database.

To accomplish another object of the present invention, there is also provided a method for issuing a cyber payment certificate marked with business identification information and processing transactions with the cyber payment certificate on the computer network, the method having the steps of (a) a server computer on the computer network, receiving information including business identification information and the number of a current account from a user and storing the information by user in a database managed by the server computer; (b) at the request of a user accessing the server computer, issuing a cyber payment certificate marked with at least a unique certificate number, a business identifier of the corresponding user, the amount of money, and a due date, and storing the issued cyber payment certificate by user in the database; and (c) if a first user, who has the issued payment certificate, performs payment to a second user, using the cyber payment certificate when the first user is connected to the server, the cyber payment certificate being moved from the first user to the second user inside of the database, in which the cyber payment certificate can be divided and transferred from the first user to the second user.

BRIEF DESCRIPTION OF THE DRAWINGS

The above objects and advantages of the present invention will become more apparent by describing in detail a preferred embodiment thereof with reference to the attached drawings in which:

FIGS. 2A and 2B briefly illustrate examples of input items for the front surface and back surface, respectively, of a conventional note being circulated at present in ordinary business transactions;

FIG. 4 is a flowchart for explaining the process for member registration and cyber payment means issuance in an embodiment of the present invention;

FIGS. 5A and 5B briefly illustrate examples of input items for issuance and endorsement of a cyber note used in an embodiment of the present invention;

FIG. 6B briefly illustrates an example of a guide screen for user's selecting a transaction type, such as cyber notes or cyber checks, in an embodiment of the present invention;

FIGS. 8A through 8C briefly illustrate an example of a guide screen for users conducting a cyber note transaction according to an embodiment of the present invention;

FIGS. 10A through 10C briefly illustrate an example of a guide screen for users conducting a cyber check transaction according to an embodiment of the present invention.

DETAILED DESCRIPTION OF THE INVENTION

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

Figure 1A:
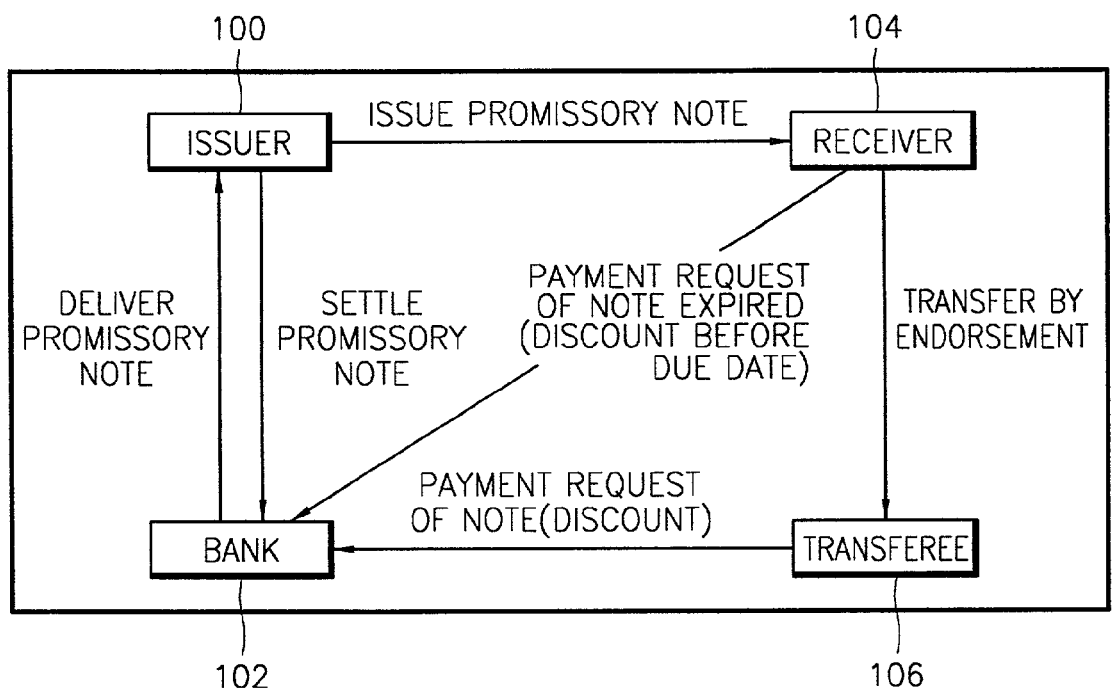
FIG. 1A is a conceptual diagram for explaining a transaction processing method using conventional notes.
Figure 1B:
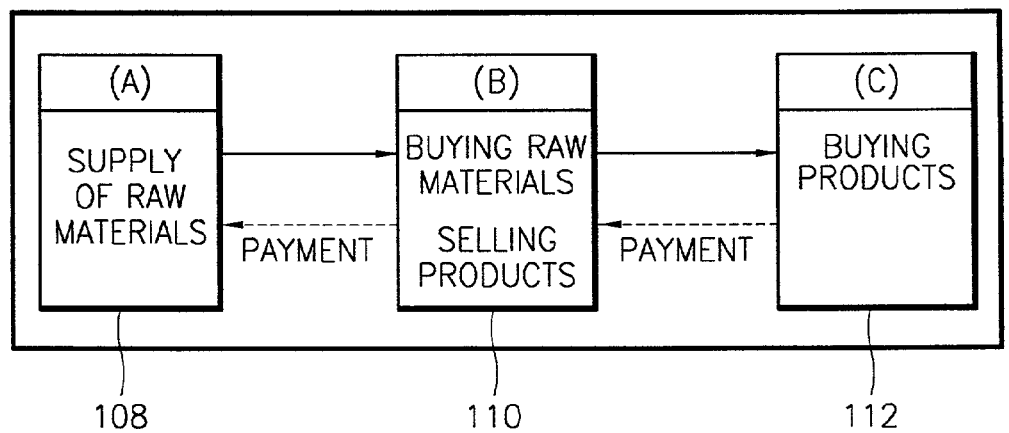
FIG. 1B is a conceptual diagram for explaining a conventional transaction method using cash, checks, or receivables on trade, which are regarded as payment means.
Figure 3:
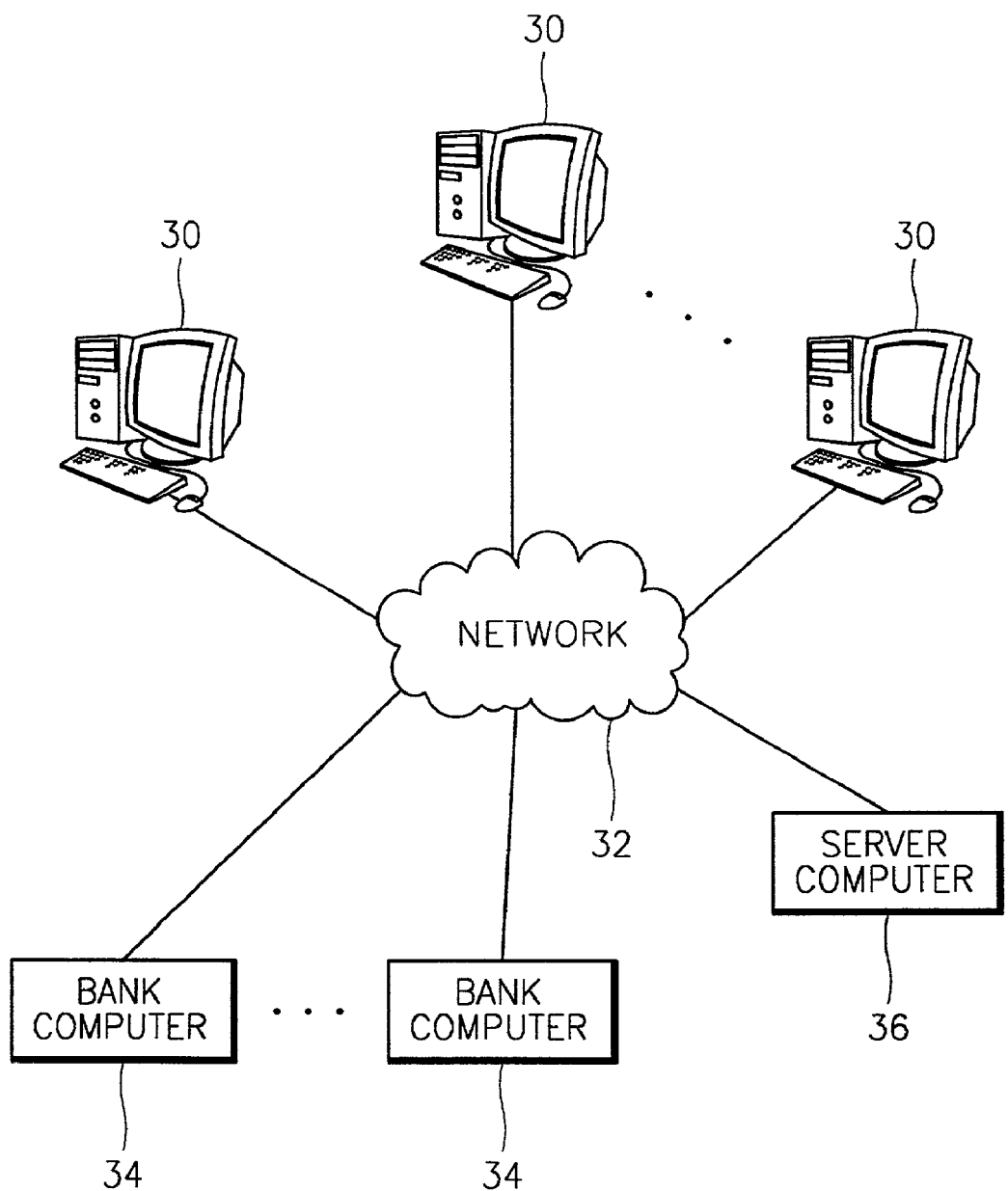
FIG. 3 illustrates the structure of a computer network system according to an embodiment of the present invention.

FIG. 3 illustrates the structure of a computer network system according to an embodiment of the present invention.

A server computer 36 is managed by a company providing services for issuing cyber payment means and processing transactions with the cyber payment means according to the present invention. A user computer 30 is managed by a user who accesses the server computer 36, and receives services for issuing cyber payment means and processing transactions with the cyber payment means between users registered in the server computer 36 in cyber space. Users are traders having business identification information. Here, business identification information means identifier (ID) which can identify a businessman. For example, it can be business registration number, corporation registration number, company name (in preparation for identical names, it is preferable that the company name together with the business registration number is used) and, the resident registration number of the chief director (for corporation) or the resident registration number of the individual trader (for individual traders). However, for convenience of explanation, an example in which the business identification information is a business registration number will now be explained.

A bank computer 34 is managed by a bank for user transactions, manages users' current accounts, and provides various information (for example, the balance of current account, etc.) needed for implementing an embodiment of the present invention to the server computer 36. Also, the server computer 36 can receive information on business registration states when connected to the computer system of the Office of National Tax Administration, which is not shown in the drawings. The server computer 36, bank computer 34, and user computers 30 are connected with each other through a network 32. The user computers 30 linked to the network 32 have Internet browsers (for example, Netscape or Internet Explorer) which can display web contents encoded in Hyper Text Markup Language (HTML).

Meanwhile, the server computer 36 has programs needed in providing online services for issuing cyber payment means and processing transactions with the cyber payment means between users, and manages a database for storing member information, payment means information and balance information.

FIG. 4 is a flowchart for explaining the process for member registration and cyber payment means issuance in an embodiment of the present invention.

Each user accesses the home page managed by the server computer 36 in step 402. In the member registration process, member information is input and stored in connection with the respective user in the database managed by the server computer 36 in step 404. Member information includes business registration number and current account number as well as general information such as name, ID, password.

If issuing a cyber payment means is requested in step 406, the cyber payment means is issued in step 408. Cyber payment means, which will be explained later, includes various electronic payment means, such as cyber promissory notes (hereinafter, referred to as cyber notes), cyber checks, and cyber payment certificates. Here, cyber payment certificates means electronic payment certificates based on receivables on trade and will be treated similarly to cyber notes in the present invention.

If the cyber payment means is a cyber note, it is not needed in step 408 to check whether the current account of the user has an enough balance. However, if the cyber payment means is a cyber check or some other payment means, cyber checks and other payments means are issued within the limit of withdrawal of the current account in step 408.

FIGS. 5A and 5B briefly illustrate examples of input items for issuance and endorsement of a cyber note used in an embodiment of the present invention. For a cyber note, necessary input items are due date, amount of money, business registration numbers of the receiver and issuer (corresponding to the front surface of an actual note in issuing), business registration numbers of the receiver and the endorser, and endorsement date (corresponding to the back surface of the actual note in endorsing).

The concept of issuance of a cyber payment means in the present invention is not that electronic money is actually issued and transmitted to users like e-cash, but that the server computer 36 issues the cyber payment means and stores the payment means by user in the database. In actual implementation, the cyber payment means is displayed on the web browser of the user computer 30 so that the user can confirm that the cyber payment means is issued, and then the cyber payment means is stored in a storage space assigned for each user in the database in units of a cyber payment means number.

Also, in processing transactions with the cyber payment means of the present invention, the cyber payment means does not move through cyber space, but a user who accesses the server computer 36 circulates the cyber payment means to other users (registered membership traders) inside the server computer 36. More specifically, processing transactions is the concept that cyber payment means data information moves from a storage space assigned to a user to a storage space assigned to another user in the database. That is, processing transactions with the cyber payment means (marked with the business registration number) between users is performed inside the database of the server computer 36. By doing so, the security problem and the problem of opacity of transactions due to anonymity, which have been pointed out as the problems of existing network-type electronic money, can be solved.

Next, the cyber payment means issued in step 408 is stored in connection with the respective user in the database managed by the server computer 36 in step 410.

Figure 6A:
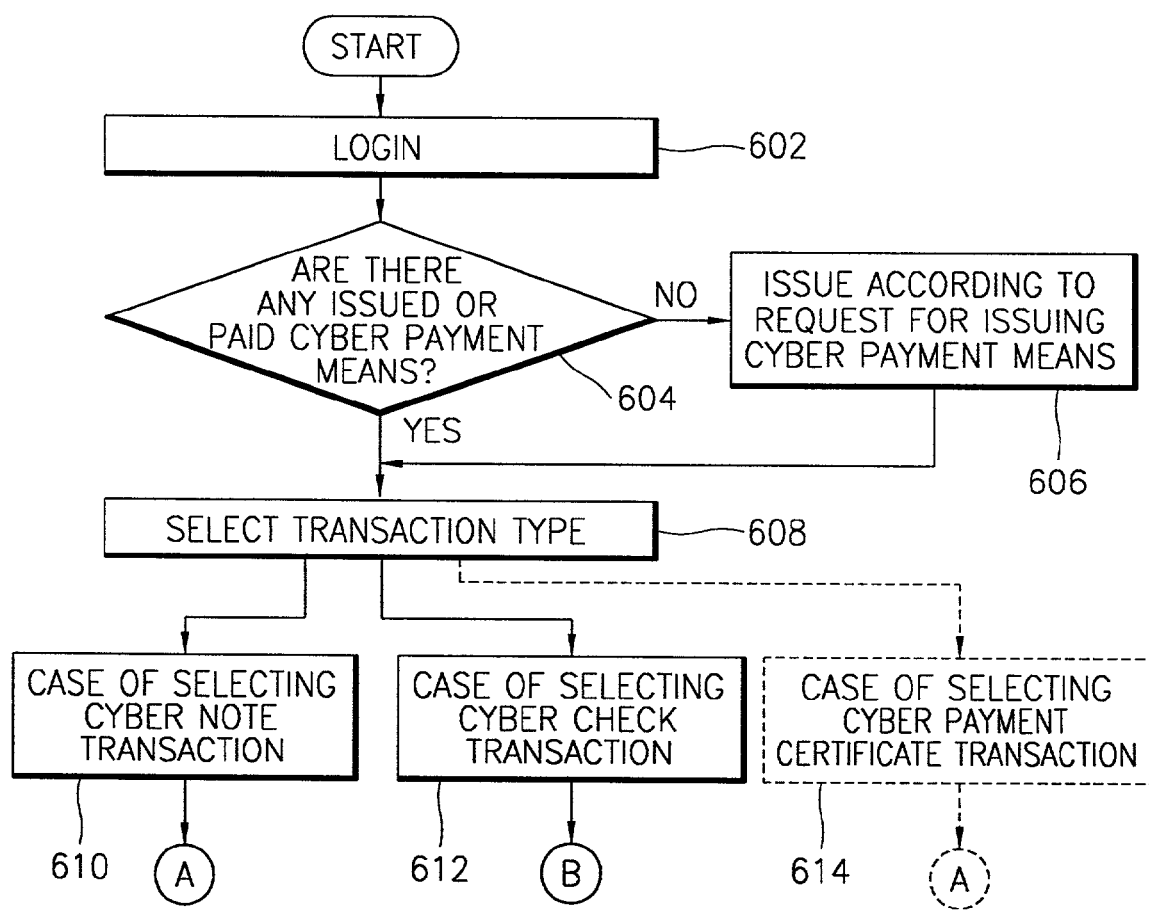
FIG. 6A is a diagram for explaining a process in which a user accesses and logs into a server computer and selects a transaction type.

FIG. 6A is a diagram for explaining a process in which a user accesses and logs into a server computer and selects a transaction type.

The user logs in in step 602, and if there are any issued or paid cyber payment means in step 604, the user can directly select transaction processing types in step 608. Otherwise, the user requests that a cyber payment means be issued and the cyber payment means is issued in step 606. That is, to perform transaction processing in the present invention, the server computer 36 is first accessed and the user needs to have cyber payment means issued or paid. However, such services as data inquiry can be used even when the user does not have cyber payment means at that time.

Selection of transaction types is divided into two cases, selection of cyber note transaction in step 610 and selection of cyber check transaction in step 612, as shown in FIG. 6B. Cyber payment certificate in step 614 is also included among the service items. However, since the cyber payment certificate is treated identically or similarly to the cyber note, an explanation of the case of using cyber payment certificates will be omitted.

Figure 7:
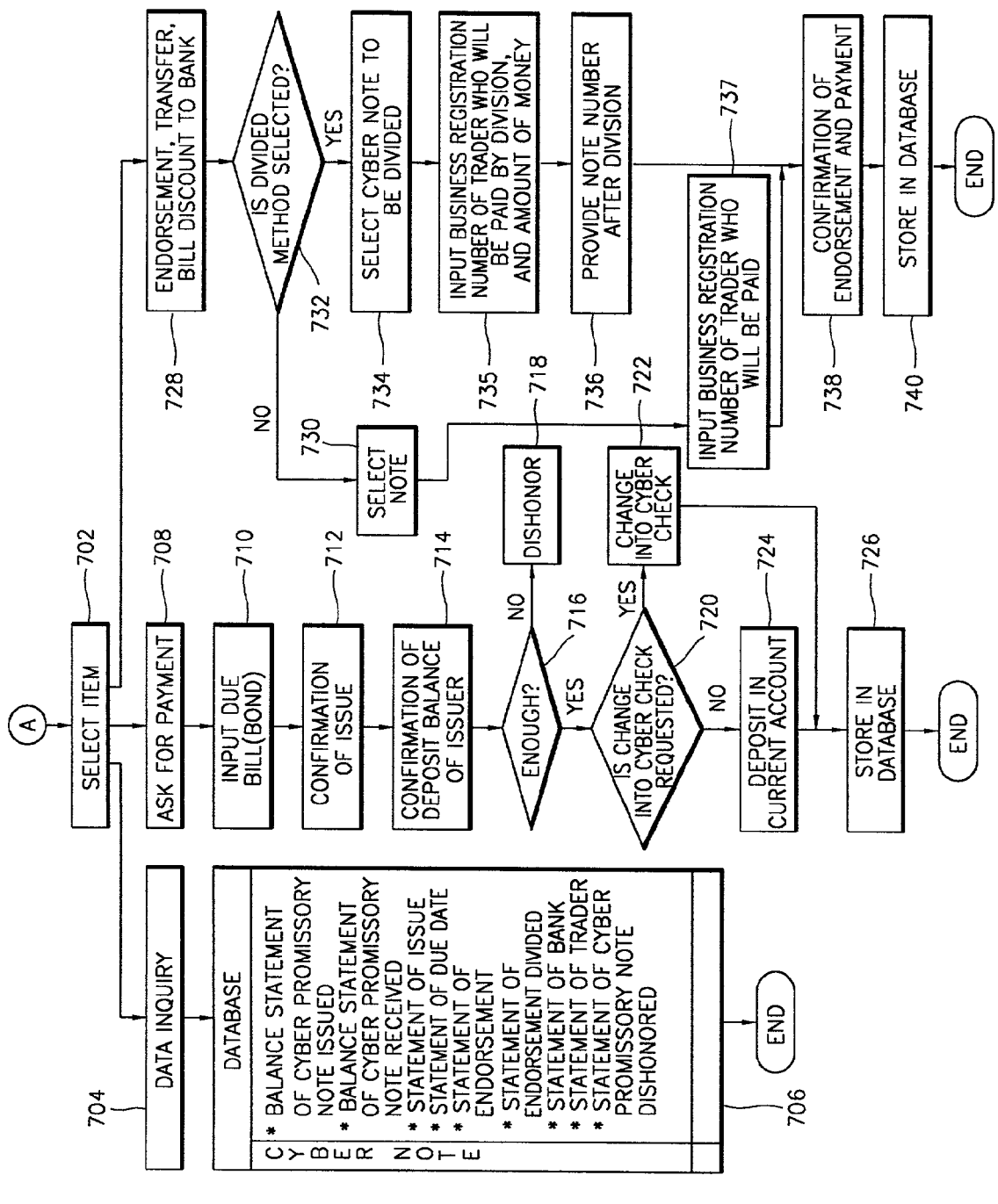
FIG. 7 is a flowchart for explaining the service using process when a user selects a cyber note transaction in an embodiment of the present invention.

FIG. 7 is a flowchart for explaining the service using process when a user selects a cyber note transaction in an embodiment of the present invention.

The user is made to select detailed items in the cyber note transaction as shown in FIG. 8A in step 702. The detailed items include data inquiry, ask for payment, and transfer by endorsement or bill discount to the bank.

If data inquiry is selected in step 704, the server computer 36 provides current states in the database requested by the user in step 706.

If ask for payment is selected by the user in step 708, the note number of due bill is input in step 710, the content of the issued cyber note is compared and checked in step 712, and if the content is correct, the balance of the issuer is checked in step 714. Because the server computer 36 is connected to the bank computer 34, the balance of the current account of the issuer can be confirmed.

It is determined whether or not the balance is enough in step 716, and if the balance is not enough, the note is treated as a dishonored note in step 718.

If the balance is enough, it is determined whether or not the user wants to change the note into a cyber check in step 720. If the user requests the change, the cyber payment means is changed into a cyber check in step 722, and the details are stored in the database in step 726. Changing into a cyber check is performed in the same way in which a new cyber check is issued. In this process, member information such as the business registration number, or the current account of the user is used.

If the user does not want to change into a cyber check, the paid money is input to the current account of the user in step 724 and the details are stored in the database assigned to the user in step 726.

If transfer by endorsement or bill discount to the bank is selected in step 728, it is determined whether or not a divided method is selected in step 732. Note transactions include an undivided method, in which the issued or paid note is transferred by endorsement without change, and a divided method, in which the issued note is divided into a plurality of notes and transferred by endorsement. If the divided method is selected, a screen as shown in FIG. 8B is displayed.

The user is made to select a cyber note to be divided in step 734. The cyber note to be divided may be a note issued for the user or a note paid by other users. Here, it is certainly preferable that the cyber note to be divided is selected through a search function. Particularly, it is preferable that a search function which searches by the amount of money is supported. Next, the business registration number of a trader who will be paid by division and the amount of money are input in step 735. Here, it is preferable that a search function for business registration numbers is provided. Also, the divided amount of money can be determined arbitrarily by the user. Input of the business registration number of the trader who will be paid corresponds to endorsement in an actual transaction.

Next, a new note number after division is assigned in step 736. This number is automatically provided if the user inputs the business registration number of the trader who will be paid by division and the amount of money. It is preferable that the note number after division, as shown in FIG. 8B, is assigned in relation to the note number before division (original note number). For convenience, FIG. 8B illustrates a case where a note before division is totally divided and paid, but it is also possible that only part of the note be divided and paid. It is impossible to divide the existing actual note by endorsement, but the note according to the present invention can be divided and paid as the user wants. Here, division of a note means to issue new cyber notes according to the amount of money (smaller than the amount of the original note) and the business registration number input by the user.

After confirming the content of endorsement, the note is transmitted to the user who is to be paid in step 738. This is performed at the moment when the user clicks on the confirm button after checking the note number to be divided, business registration number, and the amount of money in FIG. 8B. Here, transmission does not mean that the cyber note actually moves from the computer of one user to the computer of the other user through cyber space, but that cyber note information (data) moves from a storage space assigned to one user to a storage space assigned to the other user in the database managed by the server computer 36.

Cyber note transaction details of the user who divided the note and the user who received the divided note are stored in the database assigned for each user in step 740.

Meanwhile, if the undivided method is selected, the user selects the subject note as shown in FIG. 8C in step 730. For the selection, the user can directly input the number of the note issued or paid, or can select, for example, click on, the note to be used in a transaction, among a plurality of notes issued or paid. It is certainly preferable that the subject note can be selected through a search function. After inputting the note number, the business registration number of the trader who will receive the note and the amount of money are input in step 737. If the note is transmitted in step 738 after checking the endorsement details as shown in FIG. 8C, the details of transactions (payment) of the user who transferred the note and the user who received the note are stored in the database in step 740.

Figure 9:
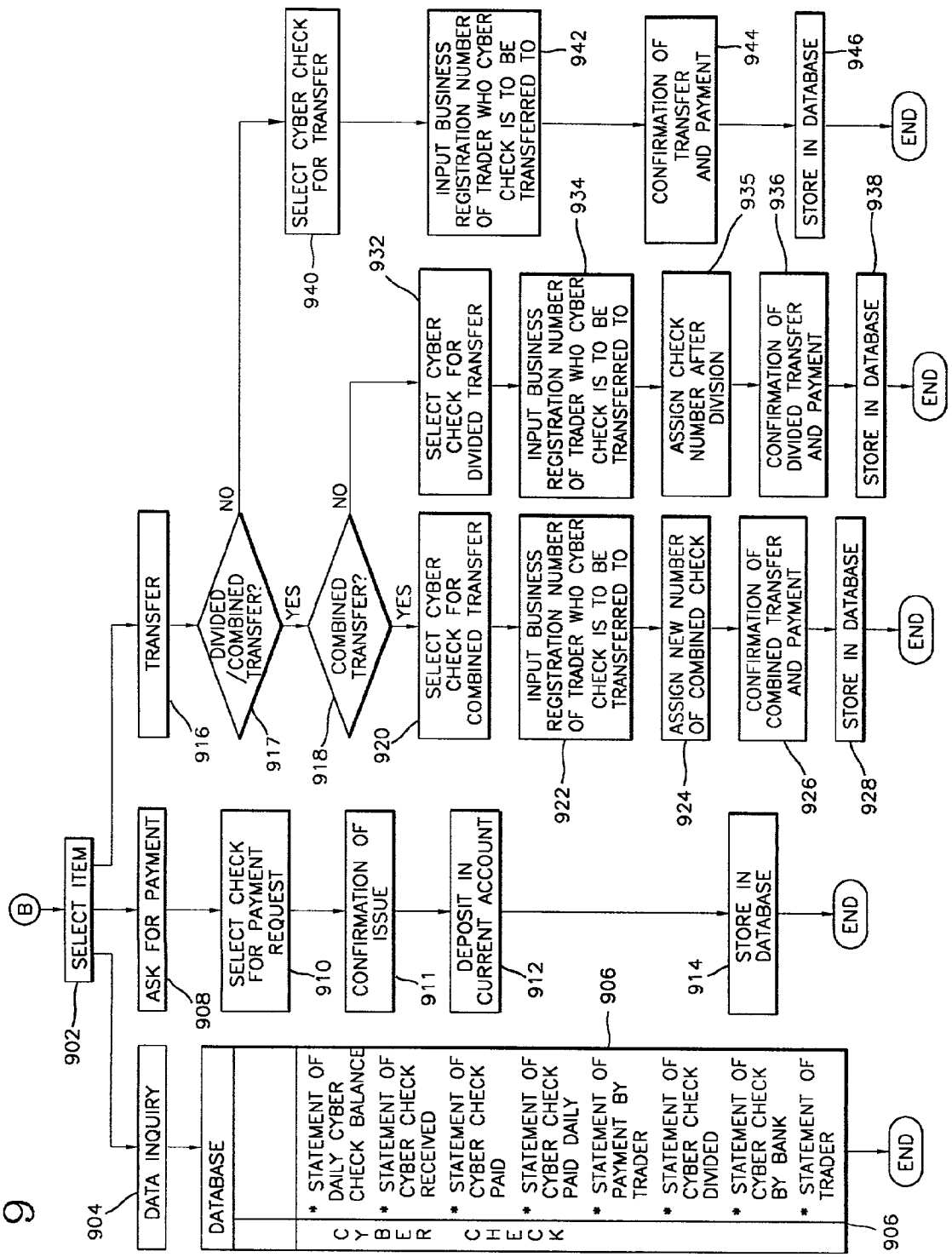
FIG. 9 is a flowchart for explaining the service using process when a user selects a cyber check transaction in an embodiment of the present invention.

FIG. 9 is a flowchart for explaining the service using process when a user selects a cyber check transaction in an embodiment of the present invention.

If a cyber check transaction is selected, the screen as shown in FIG. 10A is displayed, and the user is made to select one among data inquiry, ask for payment and transfer.

If data inquiry is selected in step 904, the server computer 36 provides current states in the database requested by the user in step 906.

If ask for payment is selected in step 908, the cyber check for payment request is input in step 910, the content of the issue is compared and confirmed in step 911, if the content is correct, the money is input into the current account of the user in step 912, and the details are stored in the database in step 914.

If transfer is selected, it is determined first that the transfer is a divided transfer or a combined transfer in step 917. If the transfer is not a divided transfer and a combined transfer, that is, if the transfer is an undivided transfer, the subject check is selected in step 940 and the business registration number of the trader to receive is input in step 942. If the check is transmitted in step 944 after the user confirms the transfer details, the details of transaction are stored in the database in step 946. Here, a function for searching for business registration numbers is provided and the concept of "transmission" is the same as described above.

Next, if the transfer is a divided transfer or a combined transfer, it is determined whether or not the transfer is a combined transfer in step 918.

If the user selects combined transfer, the numbers of cyber checks to be combined, as shown in FIG. 10B, are selected in step 920, and if the business registration number of the trader to receive is input in step 922, a new cyber check number after combination is assigned in step 924. Here, it is certainly preferable that search functions for cyber checks to be combined and transferred in step 920 and the business registration number of trader to receive in step 922 are provided. Also, it is not necessary that the cyber check number after combination has any connection with cyber check numbers before combination. Here, combination of cyber checks means issuance of a combined cyber check, for which the amounts of cyber checks to be combined are all added and a new cyber check number corresponding to the business registration number of the user to receive is assigned.

If the combined check is transmitted in step 926 after details of the combined transfer are confirmed, the details of cyber check transactions of the user who transferred the combined check and the user who received the combined check are stored in the database in step 928. Transmission here also means that cyber check information (data) is moved from a storage space assigned to a user to a storage space assigned to another user in the database managed by to the server computer 36.

If it is determined in step 918 that the transfer is not a combined transfer, the transfer is a divided transfer, as shown in FIG. 10C. The user is made to select the number of a cyber check to be transferred after division in step 932. The cyber check to be transferred after division is a cyber check which the user directly issues or receives from other traders. Then, the business registration number of the trader to receive and the amount of money are input in step 934. Here, it is certainly preferable that search functions for the cyber check to be divided and transferred in step 932 and the business registration number of the trader to receive in step 934 are provided.

Next, a new cyber check number after division is assigned in step 935. This is automatically provided if the user inputs the business registration number of the trader to receive and the amount of money. It is preferable that the cyber check number after division is provided in relation to the cyber check number before division (original cyber check number). FIG. 10C illustrates an example in which a cyber check divided and completely paid, but it is also possible that only part of the cyber check is divided and paid. Here also, division of a cyber check means issuance of smaller cyber checks which have a new cyber check numbers corresponding to each amount of money and business registration number input by the user.

If divided checks are transmitted in step 936 after the content of the divided checks are confirmed, the details of cyber check transactions of the user who transferred the divided checks and the user who received the divided checks are stored in the database in step 938. Here, the concept of "transmission" is the same as described above.

The present invention as described above can be used in electronic transaction processing between companies after cyber notes, cyber checks, or cyber payment certificates are issued. According to the present invention, users, who registered as members in the server computer, can get services for issuing cyber payment means when the users are connected to the server computer. Then, cyber payment means stored in the database can be used to settle various payments among users when the users are connected to the server computer, and the results are stored in the database assigned for each user.

The present invention may be embodied in a code, which can be read by a computer, on a computer readable recording medium. The computer readable recording medium may be any kind on which computer readable data are stored. The computer readable recording media may be storage media such as magnetic storage media (e.g., ROM's, floppy disks, hard disks, etc.), optically readable media (e.g., CD-ROMs, DVDs, etc.), or carrier waves (e.g., transmissions over the Internet). Also, the computer readable recording media can be scattered on computer systems connected through a network and can store and execute a computer readable code in a distributed mode.

The present invention is not restricted to the above-described embodiments, and many variations are possible within the spirit and scope of the present invention. For example, it is explained in the present embodiment that cyber payment means is issued and transacted through the user computer. However, the cyber payment means can be implemented to be issued and transacted by the user through an Internet television internally or externally having a set-top box, as well as mobile telephones such as PCS or cellular phones, PDA, and (portable) information communication terminals such as those complying with ITM 2000 specifications. In this case, the network described above may be a wireless communication network or cable network. Therefore, the scope of the present invention is not determined by the description but by the accompanying claims.

According to the present invention, cyber payment means (cyber notes, cyber checks, cyber payment certificates) marked with business identification information (business registration number, corporation registration number, etc.) are issued on a computer network such as the Internet and payment is processed by the cyber payment means. By doing so, cyber notes, cyber checks and cyber payment certificates will become widely used as new electronic payment means, among companies, and more specifically, the following effects are expected.

First, when the user is connected to the server computer, a cyber note or cyber check is issued and transaction processing is made by the payment means, and by doing so, huge costs for issuing and managing actual notes or checks can be reduced.

Second, the risk of fake or counterfeit resulting from circulation of actual notes can be reduced. Also, the security problem resulting from the movement of electronic money through cyber space, which has been pointed out as a problem of the existing network-type electronic money, can be solved.

Third, since all users have to input business identification information, such as business registration numbers, in issuing cyber notes, cyber checks and cyber payment certificates, and in processing transactions with the cyber payment means, the transparency of transactions can be obtained.

Fourth, since cyber notes or cyber checks are managed in computer systems, it is easy to manage dishonored notes in total, and the problem of repeatedly dishonoring notes or checks can be prevented. Also, if cyber note transaction according to the present invention is managed together with a note payment guarantee system, the drawback of the existing note system which may cause repeated dishonoring of notes or checks can be prevented.

Fifth, an actual note or check has a limitation in endorsement because of the limited space on the paper, but the cyber note or check has no such limitation and continuous endorsement without limit is enabled.

Sixth, since issuance related data of a company which issues cyber notes or cyber checks can be maintained, the cyber payment means can contribute to the prevention of illegal transactions and the establishment of a credit society, and can also realize tax justice and prevent income from illicit transactions.

Seventh, since notes or checks for large amounts of money can be divided and transferred, payment means denoting large amounts of money can be utilized as payment means for small amounts of money too, the cyber payment means can be widely used as a system convenient for processing transactions of receivables and payables on trade between companies.

Eighth, smoothing electronic transaction processing in electronic commerce between companies, the cyber payment means according to the present invention can promote electronic commerce.

What is claimed is:

1. A system for issuing a cyber payment means for paying in cyber space marked with business identification information and processing transactions with the cyber payment means on a computer network, the system comprising:
   a server computer configured to provide services to issue a cyber payment means and processing transactions with the cyber payment means on the computer network; and
   a database managed by the server computer,
   wherein the server computer is configured to:
      receive member information including business identification information and a number of a current account from a user and stores the information by user in the database,
      issue the cyber payment means at the request of a user accessing the server computer, the cyber payment means being marked with at least a unique number of the cyber payment means, a business identifier of the corresponding user, and an amount of money,
      store the issued cyber payment means by user in the database; and
      move the cyber payment means from a first user to a second user inside of the database when the first user, who has the issued cyber payment means, performs payment to the second user using the cyber payment means when the first user is connected to the server
   wherein the system is configured so that moving the cyber payment means from the first user to the second user inside of the database when the first user, who has the issued cyber payment means, performs payment to the second user includes one or more of the following:
      (1) receiving a request from the first user that a cyber check is divided into a plurality of cyber checks and paid; and
      (2) receiving a request from the first user that a plurality of cyber checks are combined into one cyber check and paid,
   wherein (1) includes:
      (11) receiving input of a cyber check to be divided from the first user;
      (12) receiving input of a business identifier of a second user to be paid with a cyber check resulting from the division of the cyber check input in (11), and an amount of money of the cyber check resulting from the division;
      (13) issuing a cyber check resulting from the division of the cyber check input in (11) with a newly assigned check number, corresponding to the business identifier and divided money input in (12); and
      (14) receiving a request from the first user for payment to be performed using the divided cyber check issued in (13), and
   wherein, in (13), the check number of the cyber check resulting from the division of the cyber check input in (11) is assigned corresponding to the check number of the cyber check input in (11) before division, and
   wherein (2) includes:
      assigning to the combined cyber check a newly assigned check number corresponding to a check number of one of the plurality of cyber checks before combination.

2. The system of claim 1 wherein the cyber payment means is a cyber note, and
   wherein the cyber note is related to the current account of the corresponding user and marked with at least a unique note number and a due date.

3. The system of claim 1, wherein the cyber payment means is a cyber check and the amount of money is within a withdrawal limit of the current account of the corresponding user.

4. The system of claim 1, wherein the cyber payment means is a cyber payment certificate, the cyber payment certificate is marked with at least a unique certificate number and a due date, and wherein the cyber payment certificate can be divided and transferred from the first user to the second user.

5. The system of claim 1, wherein (2) comprises:
   (21) receiving input of cyber checks to be combined from the first user;
   (22) receiving input of a business identifier of the second user to be paid with the combined cyber check after combination, from the first user;
   (23) issuing the combined cyber check marked with a sum of money of cyber checks to be combined, the business identifier of the second user to be paid, and the newly assigned check number; and
   (24) receiving a request from the first user for payment to be performed using the combined cyber check issued in (23).

* * * * *